United States Patent [19]
Stark

[11] 3,731,891
[45] May 8, 1973

[54] WEB MATERIAL FEEDING APPARATUS

[75] Inventor: Daniel J. Stark, Rochester, N.Y.

[73] Assignee: Eastman Kodak Company, Rochester, N.Y.

[22] Filed: Sept. 9, 1971

[21] Appl. No.: 178,954

[52] U.S. Cl. ................242/195, 226/147, 352/157
[51] Int. Cl. ..........................G03b 1/04, G11b 15/32
[58] Field of Search..............242/192, 195, 197–200, 242/187; 226/91, 92, 147; 352/157, 158, 72, 78

[56] References Cited

UNITED STATES PATENTS

| | | | |
|---|---|---|---|
| 3,628,751 | 12/1971 | Brauning et al. | 242/187 |
| 3,662,971 | 5/1972 | Riedel | 242/192 |
| 3,672,754 | 6/1972 | Riedel | 352/158 |

Primary Examiner—Leonard D. Christian
Attorney—W. H. J. Kline et al.

[57] ABSTRACT

Motion picture projector apparatus includes a spindle for receiving a roll of film or the like and for rotating the roll of film take-up direction through a clutch which is disengaged when the torque between the clutch parts exceeds a predetermined value. A hook-like member is adapted to be moved into close proximity to the rotating roll for engaging the film through an opening in a leading end portion of the film. Engagement of the film by the hook prevents further rotation of the roll in a take-up direction to increase the torque between the clutch parts to a value in excess of the predetermined value. A drive member is engageable with the roll to rotate the roll in an unwinding direction after the clutch has been disengaged. A stripping member is engageable with the roll for separating the leading end portion of the web material from the roll and for directing the leading end portion away from the roll during rotation of the roll in an unwinding direction.

9 Claims, 6 Drawing Figures

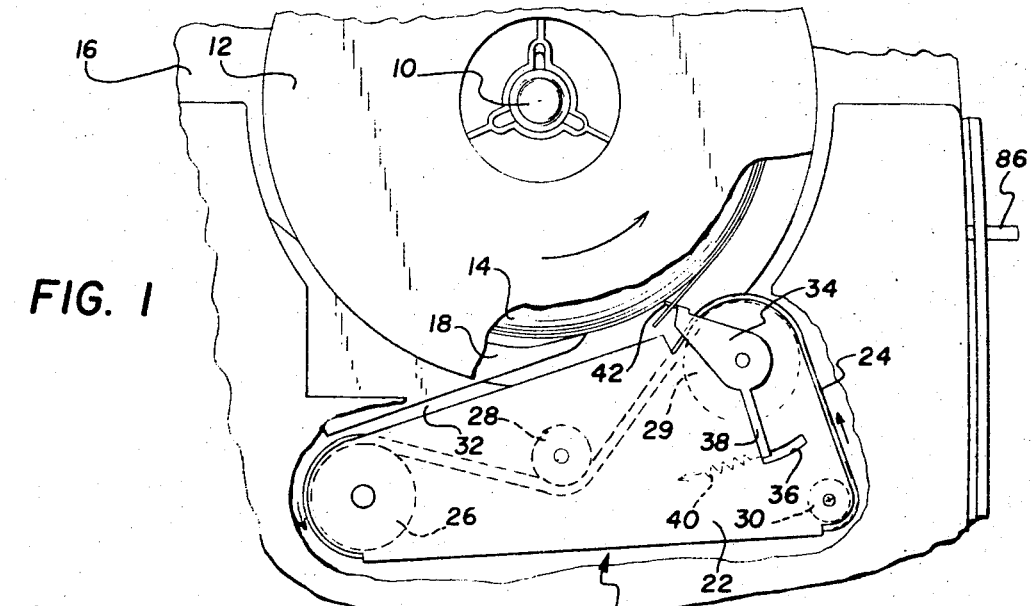
FIG. 1
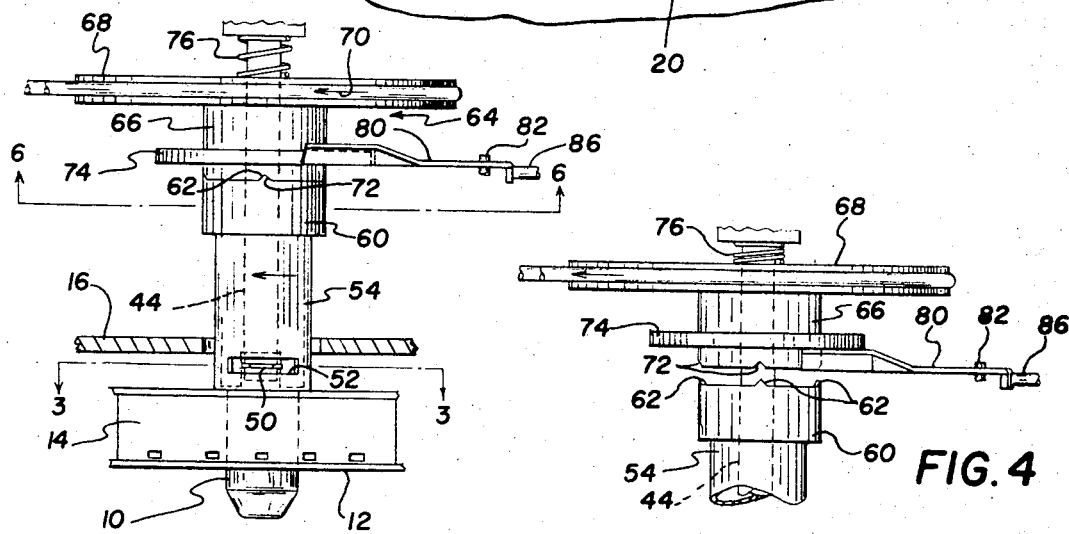
FIG. 2
FIG. 4
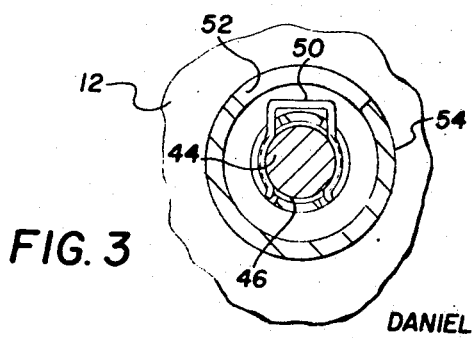
FIG. 3
DANIEL J. STARK
INVENTOR.
BY Milton S. Sales
W. H. J. Kline
ATTORNEYS

PATENTED MAY 8 1973 3,731,891

DANIEL J. STARK
INVENTOR.

BY *Milton S. Sales*
*H. H. J. Kline*
ATTORNEYS

WEB MATERIAL FEEDING APPARATUS

CROSS-REFERENCE TO RELATED APPLICATIONS

Reference is made to commonly assigned copending U.S. Patent applications Ser. No. 875,819, now U.S. Pat. No. 3,628,751 entitled AUTOMATIC FILM THREADING DEVICE, filed Nov. 12, 1969 in the names of Gerhardt Brauning and Wolfgang Ort and Ser. No. 77,959, entitled MOTION PICTURE PROJECTOR APPARATUS, filed Oct. 5, 1970 in the names of William A. Martin and John Q. Sinclair, II.

BACKGROUND OF THE INVENTION

1. Field of the Invention

This invention relates to motion picture projector apparatus, and more particularly to apparatus for automatically feeding film from a roll of film.

2. Description of the Prior Art

Commonly assigned U.S. Pat. No. 3,429,518, issued Feb. 25, 1969 in the name of E. S. McKee and entitled DEVICE FOR STRIPPING AND FEEDING STRIP MATERIAL FROM A ROLL, discloses a film feeding mechanism comprising a driven endless belt and a stripping finger that are selectively movable into a cartridge or the like for engaging a film roll within the cartridge. The belt drives the film roll in an unwinding direction and the finger separates the leading end of the film from the roll. The film is then guided by the belt and finger into a film gate and the film feeding mechanism is automatically retracted from the cartridge. A modification to the film-feeding mechanism disclosed in the McKee patent has been described in commonly assigned U.S. Pat. No. 3,468,498, issued on Sept. 23, 1969 in the name of L. J. Bunting, entitled SUPPLY ROLL SPINDLE ASSEMBLY FOR CINEMATOGRAPHIC PROJECTORS. While the apparatus disclosed in the beforementioned patent has proved successful, the film feeding mechanism operates best when the film roll is carried within a cartridge.

In beforementioned copending patent application Ser. No. 875,819, film feeding is achieved by use of a driven sprocket that is engageable with openings in a film strip (such as the usual sprocket holes or perforations normally provided in motion picture film) for driving film from a supply roll to self-threading apparatus of a projector. The openings in the filmstrip are brought into engagement with the sprocket by first rotating the film supply roll in a take-up direction, thereby causing the free, leading end portion of the film roll to be swung in a circular path into contact with the sprocket. In the beforementioned copending patent application Ser. No. 77,959, a film feeding mechanism is provided that comprises a member having a hook portion that is adapted to enter an opening provided in the leading end portion of a strip of web material. The member is mounted for movement between a first position wherein the hook portion is closely adjacent to the roll of web material and positioned with respect thereto for entering the opening in response to rotation of the roll in a take-up direction and a second position wherein the hook portion is spaced from the roll and the web material is delivered to web advancing apparatus. British Pat. No. 1,211,763 also shows a form of film feeding mechanism.

SUMMARY OF THE INVENTION

In accordance with a preferred embodiment of the present invention, motion picture projector apparatus includes a spindle for receiving a roll of film or the like and for rotating the roll in a film take-up direction through a clutch which is disengaged when the torque between the clutch parts exceeds a predetermined value. A hook-like member is adapted to be moved into close proximity to the rotating roll for engaging the film through an opening in a leading end portion of the film to prevent further rotation of the roll, thereby increasing the torque on the clutch to a value in access of the predetermined value. A drive member is engageable with the roll to rotate the roll in the unwinding direction after the clutch has been disengaged. A stripping member is engageable with the roll for separating the leading end portion of the film from the film roll and for directing the leading end portion away from the roll during rotation of the roll in an unwinding direction by the drive member.

The invention, and its objects and advantages, will become more apparent in the detailed description of the preferred embodiment presented below.

BRIEF DESCRIPTION OF THE DRAWINGS

In the detailed description of the preferred embodiment of the invention presented below, reference is made to the accompanying drawings in which:

FIG. 1 is a fragmentary elevational view showing a preferred specific embodiment of web material feeding apparatus of the present invention with the elements of the apparatus in one condition;

FIG. 2 is a top plan view partially in section of the spindle and spindle drive mechanism of the apparatus shown in FIG. 1 with the spindle clutch engaged;

FIG. 3 is a sectional view taken along line 3—3 of FIG. 2;

FIG. 4 is a partial view of the mechanism shown in FIG. 2 with the spindle clutch disengaged;

DESCRIPTION OF THE PREFERRED EMBODIMENT

Figure 5:
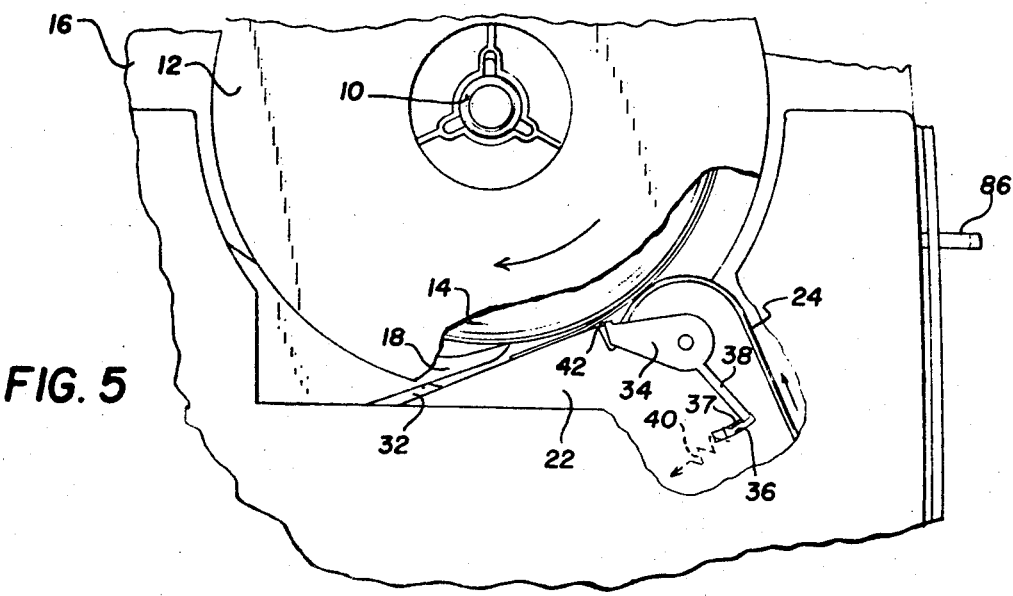
FIG. 5 is a fragmentary elevational view similar to FIG. 1 showing the apparatus as the leading end portion of the film is being separated from the roll and directed away therefrom.

Because motion picture projectors are well known, the present description will be directed in particular to elements forming part of, or cooperating more directly with, the present invention. Apparatus not specifically shown or described herein being understood to be selectable from those known in the art.

Referring to FIG. 1, a projector made in accordance with the present invention comprises a roll drive member or supply spindle 10 which is adapted to nonrotatably receive a film reel 12 containing a supply roll 14 of film. Reel 12 may be carried in a cartridge, such as for example, a cartridge as shown in U.S. Pat. No. 3,468,498, but this is not necessary for proper operation of the projector of this invention. Spindle 10 projects through a mechanism plate 16. The spindle is adapted to be selectively driven in a web take-up direction by apparatus to be described in detail hereinafter, or allowed to rotate freely.

A film feeding mechanism includes a film stripping finger or member 18 supported by a mechanism, not shown, for movement between an inactive position spaced from film roll 14 and an active position as shown in FIG. 1 wherein it engages the outer convolution of roll 14. A roll drive mechanism 20 includes a pair of plates (one of which is shown at 22) and an endless belt 24 trained about a drive pulley 26 and three idler pulleys 28, 29 and 30. The belt is driven in the direction indicated by the arrows in FIG. 1 and the roll drive mechanism can be swung about the axis of pulley 26 from an inactive or retracted position (not shown) to an active position wherein belt 24 is in engagement with the outer convolution of film roll 14 to drive the film roll in an unwinding (clockwise) direction. Suitable means for driving the belt and for swinging it and film stripping finger 18 between their respective inactive and active positions are disclosed in more detail in U.S. Pat. No. 3,558,028, entitled CONTROL DEVICE FOR SELF-THREADING MOTION PICTURE PROJECTOR which issued on Jan. 26, 1970 in the name of Leslie J. Bunting. The roll drive mechanism and finger may be arranged for manual movement to their active positions as disclosed in coassigned U.S. Pat. No. 3,584,943, entitled SELF-THREADING MOTION PICTURE PROJECTOR OR THE LIKE which issued on June 15, 1971 in the name of Robert J. Roman.

When the belt and finger are in their active positions relative to a supply roll of film as shown in FIG. 1, and when spindle 10 is adapted to rotate freely as will be explained hereinafter, belt 24 drives the film roll in an unwinding direction, and finger 18 lifts the leading end of the film from the roll. The film is fed through a substantially closed channel 32 to a conventional film drive mechanism, not shown, of the projector.

A hook member 34 is rotatably carried on the shaft of pulley 29 for movement about that shaft within the limits permitted by a slot 36 in plate 22 into which slot a lug 37 (FIG. 5) extends from a leg portion 38 of hook member 34. The hook member is resiliently urged in a counterclockwise direction as viewed in FIG. 1 by a tension spring 40. Hook member 34 includes a pointed hook portion 42. When drive member 20 is in its active position, the point of the hook member falls into an opening provided in the center of the leading end portion of the film as the film roll rotates in a counterclockwise direction. Once the point has entered the film opening and the film roll is cinched tight, further rotation of the roll is prevented by the hook member and slot 36.

Referring to FIGS. 2 and 3, a shaft 44 is non-rotatably mounted on the projector housing and extends through mechanism plate 16. The shaft has an annular groove 46 adjacent its free end, and spindle 10 is rotatably mounted on the shaft by a spring clip 50 which cooperates with annular groove 46 to prevent spindle 10 from moving axially along the shaft. During assembly, the spindle is mounted on the shaft end and spring clip 50 is attached through an opening 52 in an outer cylindrical wall 54 of the spindle. Other means for holding spindle 10 on shaft 44 will readily occur to those skilled in the art. Means are provided on the end of spindle 10 for receiving a film reel such as reel 12. The open end of cylindrical wall 54 forms a driven clutch part 60 having four axially extending prongs 62 spaced 90° apart.

A spindle drive assembly 64 includes a bearing member 66 axially and rotatably movable relative to shaft 44. Bearing member 66 carries a pulley 68 which is constantly driven in the direction of arrow 70 (counterclockwise as viewed in FIG. 1) by suitable power means when the projector is in operation. Bearing member 66 forms a drive clutch part for cooperation with driven clutch part 60 in that it includes four axially-extending grooves 72 spaced circumferentially about one end of bearing member 66 to mate with prongs 62. An annular flange 74 is formed on bearing member 66 which is biased toward the free end of shaft 44 by a coil compression spring 76.

Figure 6:
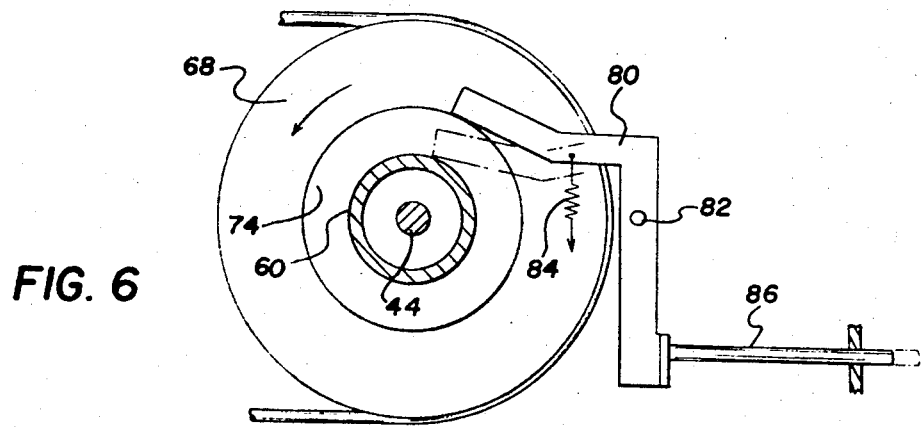
FIG. 6 is a sectional view taken along line 6—6 of FIG. 2 showing the mechanism for re-engaging the spindle drive clutch to rewind film onto the supply roll.

A clutch positioning arm or latching bar 80 is pivotally mounted on the projector housing at 82 for movement between an inactive position shown in solid lines in FIG. 6 and an active position shown in phantom lines in that figure. Arm 80 is biased toward its active position by a tension spring 84, and in that position the arm prevents bearing member 66 from being moved by spring 76 to a position engaging driven clutch part 60. When arm 80 is rotated to its inactive position, spring 76 moves the bearing member into engagement with the driven clutch part, and arm 80 rests on flange 74. A control pin 86 may be pushed by the operator or by some suitable mechanism to move arm 80 to its inactive position.

OPERATION

In operation, a reel 12 is placed on spindle 10 while roll drive mechanism 20 and finger member 18 are in their inactive positions. Pin 86 is pushed to move arm 80 to its inactive position, insuring that driven clutch part 60 is engaged by bearing member 66 so that rotation of the bearing member by pulley 68 will cause rotation of reel 12 in a direction to wind film onto the roll. To feed the leading end portion of film roll 14 from reel 12, finger 18 is moved to its active position shown in FIG. 1 and roll drive member 20 is moved to engage the outer convolution of the film roll. As mentioned hereinbefore, the operation of finger 18 and drive member 20 is disclosed in U.S. Pat. No. 3,558,028. As the leading end portion of the film passes point 42 of hook member 34, the hook point will fall into the opening provided at the end of the film's leading end portion to prevent further rotation of reel 12 and spindle 10. This will increase the torque between bearing member 66 and driven clutch part 60 so that the bearing member will ride up the surfaces of prongs 62, compressing spring 76. As the bearing member moves axially along shaft 44, arm 80 falls behind annular flange 74 to prevent the bearing member from returning toward clutch part 60.

Spindle 10 may now rotate freely on shaft 44. As shown in FIG. 5, belt 24, rotating in a direction to feed film away from roll 14, can now advance the film's leading end portion toward finger 18 in a manner described in above-mentioned U.S. Pat. No. 3,558,028. During this time, hook member 34 has been rotated in a counterclockwise direction as viewed in FIG. 1 by the film roll so that hook point 42 is removed from the path of film travel. The film continues to be advanced by belt 24 along channel 32 until it reaches the projector's film advancing mechanism, not shown, whereupon sensing means which may be of the type described in U.S. Pat. No. 3,558,028 return finger 18 and roll drive mechanism 20 to their inactive positions for normal projection of the film.

After the entire roll has been projected (or at any other time that rewind is desired), the film may be rewound onto reel 12 by disengaging the projector's film advancing mechanism and by manually depressing pin 86 to move arm 80 to its inactive position shown in solid lines in FIG. 6. Since bearing member 66 is no longer blocked by arm 80 engaging flange 74, spring 76 may move the bearing member axially along shaft 44 to once again engage driven clutch part 60, thereby rotating reel 12 in a film take-up direction.

The invention has been described in detail with particular reference to preferred embodiments thereof, but it will be understood that variations and modifications can be effected within the spirit and scope of the invention.

I claim:

1. Apparatus for feeding a leading end portion of a strip of web material from a roll of such material, said apparatus comprising:
   a. a roll drive member for rotatably supporting the roll on said apparatus;
   b. drive means; and
   c. clutch means including
      1. a rotatable drive clutch part drivingly connected to said drive means,
      2. a driven clutch part drivingly connected to said roll drive member,
      3. means for moving at least one of said clutch parts into driving engagement with the other of said clutch parts to thereby couple said drive means with said roll drive member for rotating said roll drive member in a direction to wind web material onto the roll, and
      4. torque responsive means for disengaging said clutch parts when the torque between said clutch parts exceeds a predetermined value, whereupon said drive member can rotate freely and independently of said drive means to permit feeding of the leading end portion of the strip of web material from the roll.

2. Apparatus as defined in claim 1 further comprising:
   a. latch means for releasably keeping said clutch parts disengaged; and
   b. means for releasing said latch means to permit said moving means to cause re-engagement of said clutch parts.

3. Apparatus as defined in claim 1 further comprising:
   a. latch means for releasably keeping said clutch parts disengaged, said latch means including
      1. means on said one clutch part for defining a surface facing said other clutch part and substantially perpendicular to the direction of movement of said one clutch part,
      2. a latching bar movable from an inactive position to an active position abutting said surface and blocking movement of said one clutch part into engagement with said other clutch part, and
      3. means for moving said latching bar to its active position upon disengagement of said clutch parts by said torque responsive means; and
   b. means for selectively moving said latching bar to its inactive position to permit said moving means to cause reengagement of said clutch parts.

4. Apparatus for feeding a leading end portion of a strip of web material from a roll of such material, the roll being rotatably supported on the apparatus and the web having an opening in its leading end portion, said apparatus comprising:
   a. means for rotating the roll in a first direction for taking up web material onto the roll;
   b. a member having a hook portion positionable adjacent the roll for entering the opening in the leading end portion to prevent further rotation of the roll in said first direction;
   c. stripping means engageable with the roll for separating the leading end portion of the web material from the roll and for directing the leading end portion away from the roll during rotation of the roll in a second, unwinding direction; and
   d. drive means engageable with and adapted to rotate the roll in said second direction so that the leading end portion is moved toward said stripping means.

5. Apparatus as defined in claim 4 wherein said hook portion and said drive means are carried by a common lever for simultaneous movement into engagement with the roll.

6. Apparatus for feeding a leading end portion of a strip of web material from a roll of such material rotatably supported on the apparatus, said apparatus comprising:
   a. means for rotating the roll in a first direction for taking up web material onto the roll;
   b. stripping means engageable with the roll at a first position for separating the leading end portion of the web material from the roll and for directing the leading end portion away from the roll and during rotation of the roll in a second, unwinding direction;
   c. drive means engageable with the roll at a second position spaced circumferentially from said first position and adapted to rotate the roll in said second direction so that the leading end portion is moved toward said stripping means; and
   d. means engageable with the roll at a third position between said first and second positions for seizing the leading end portion of the web material during rotation of the roll in said first direction to disable said means for rotating the roll in said first direction.

7. Apparatus as defined in claim 6 wherein said web has an opening in its leading end portion and said seizing means comprises a hook portion positionable adjacent the roll for entering the opening to prevent further rotation of the roll in said first direction.

8. Apparatus for feeding a leading end portion of a strip of web material from a roll of such material, the web having an opening in its leading end portion, said apparatus comprising:
   a. a roll drive member for rotatably supporting the roll on said apparatus;
   b. drive means;

c. clutch means including
   1. a rotatable drive clutch part drivingly connected to said drive means,
   2. a driven clutch part drivingly connected to said roll drive member,
   3. means for moving at least one of said clutch parts into driving engagement with the other of said clutch parts to thereby couple said drive means with said roll drive member for rotating said roll drive member in a direction to wind web material onto the roll, and
   4. torque responsive means for disengaging said clutch parts when the torque between said clutch parts exceeds a predetermined value, whereupon said drive member may rotate freely and independently of said drive means to permit feeding of the leading end portion of the strip of web material from the roll;
d. a member having a hook portion positionable adjacent the roll for entering the opening in the leading end portion to prevent further rotation of the roll in said first direction thereby increasing the torque between said clutch parts to a value exceeding said predetermined value;
e. stripping means engageable with the roll for separating the leading end portion of the web material from the roll and for directing the leading end portion away from the roll during rotation of the roll in a second, unwinding direction; and
f. drive means engageable with and adapted to rotate the roll in said unwinding direction when said clutch parts have been disengaged so that the leading end portion is moved toward said stripping means.

9. Apparatus for feeding a leading end portion of a strip of web material from a roll of such material, said apparatus comprising:
a. roll drive member for rotatably supporting the roll on said apparatus;
b. drive means;
c. clutch means including
   1. a rotatable drive clutch part drivingly connected to said drive means,
   2. a driven clutch part drivingly connected to said roll drive member,
   3. means for moving at least one of said clutch parts into driving engagement with the other of said clutch parts to thereby couple said drive means with said roll drive member for rotating said roll drive member in a direction to wind web material onto the roll, and
   4. torque responsive means for disengaging said clutch parts when the torque between said clutch parts exceeds a predetermined value, whereupon said drive member may rotate freely and independently of said drive means to permit feeding of the leading end portion of the strip of web material from the roll;
d. stripping means engageable with the roll at a first position for separating the leading end portion of the web material from the roll and for directing the leading end portion away from the roll during rotation of the roll in a second, unwinding direction;
e. drive means engageable with the roll at a second position spaced circumferentially from said first position and adapted to rotate the roll in said second direction when said clutch parts have been disengaged so that the leading end portion is moved toward said stripping means; and
f. means engageable with the roll at a third position between said first and second positions for seizing the leading end portion of the web material during rotation of the roll in said first direction to disable said means for rotating the roll in said first direction.

* * * * *